United States Patent
Bakare et al.

(10) Patent No.: US 12,459,828 B2
(45) Date of Patent: Nov. 4, 2025

(54) METHOD OF MAKING ZEOLITE

(71) Applicant: KING FAHD UNIVERSITY OF PETROLEUM AND MINERALS, Dhahran (SA)

(72) Inventors: Akolade Idris Bakare, Dhahran (SA); Galal A. Naseer, Dhahran (SA); Mohammed Ahmed Sanhoob, Dhahran (SA); Zain Hassan Yamani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 577 days.

(21) Appl. No.: 17/881,173

(22) Filed: Aug. 4, 2022

(65) Prior Publication Data
US 2024/0043279 A1 Feb. 8, 2024

(51) Int. Cl.
*C01B 39/38* (2006.01)

(52) U.S. Cl.
CPC .......... *C01B 39/38* (2013.01); *C01P 2002/72* (2013.01); *C01P 2002/88* (2013.01); *C01P 2004/03* (2013.01); *C01P 2004/38* (2013.01); *C01P 2004/61* (2013.01); *C01P 2004/62* (2013.01)

(58) Field of Classification Search
None
See application file for complete search history.

(56) References Cited

U.S. PATENT DOCUMENTS

| | | | | |
|---|---|---|---|---|
| 4,079,019 A | * | 3/1978 | Scherzer | B01J 29/088 502/68 |
| 6,117,810 A | * | 9/2000 | Lee | B01J 20/20 423/325 |
| 2009/0291839 A1 | * | 11/2009 | Kunieda | B01J 35/56 428/116 |
| 2018/0185817 A1 | * | 7/2018 | Stabler | B01J 20/3007 |

FOREIGN PATENT DOCUMENTS

| | | | |
|---|---|---|---|
| AU | 2218988 | * | 3/1990 |
| CA | 1310945 | * | 12/1992 |
| CA | 1310945 C | * | 12/1992 |
| CN | 104709922 | * | 6/2015 |
| CN | 105036152 B | | 5/2017 |
| CN | 106807437 | * | 6/2017 |
| CN | 107954436 A | | 4/2018 |
| CN | 108217672 | * | 6/2018 |
| CN | 105728019 B | | 7/2018 |
| CN | 106944127 B | | 10/2019 |
| CN | 112174164 | * | 1/2021 |
| CN | 114426281 | * | 5/2022 |
| JP | 2017523113 | * | 8/2017 |
| TW | I697357 B | | 7/2020 |
| WO | 2016086362 | * | 9/2016 |
| WO | 2020061745 | * | 2/2020 |

OTHER PUBLICATIONS

Petrik, L "The influence of cation, anion and water content . . . ". South African Journal of Science. 105. (2009). (Year: 2009).*
Songlin, et al. ; Influence of Synthesis Parameters with Low Seed Addition on the Crystallinity of ZSM-5 ; https://www.cnki.com.en/Article/CJFDTotal-CPPP201304013.htm ; Mar. 31, 2022 ; 2 Pages.
Yang, et al. ; Product distribution and catalytic performance of nano-sized H-ZSM-5 zeolites in the methanol-to-aromatics (MTA) reaction ; Petroleum Science and Technology vol. 35, Issue 10 ; Aug. 30, 2017 ; pp. 955-962 ; Abstract Only ; 2 Pages.
Hyun, et al. ; Synthesis of ZSM-5 zeolite composite membranes for $CO_2$ separation ; Journal of Materials Science 34 ; Jul. 1999 ; Abstract Only ; 5 Pages.

* cited by examiner

*Primary Examiner* — Sheng H Davis
(74) *Attorney, Agent, or Firm* — Oblon, McClelland, Maier & Neustadt, L.L.P.

(57) ABSTRACT

The present disclosure relates to a method of making a zeolite. The method includes mixing an aluminum nitrate with an aqueous solution of NaOH to form a first mixture followed by mixing silica gel with the first mixture to form a second mixture. The second mixture is heated with microwave irradiation to form a first sample. The method further includes washing, drying, and ion exchanging the first sample with ammonium nitrate to form a second sample. The method includes calcining the second sample to form the zeolite, wherein the method does not use a seed or a structural directing agent.

18 Claims, 6 Drawing Sheets

METHOD OF MAKING ZEOLITE

BACKGROUND

Technical Field

The present disclosure is directed to a method of making a zeolite. More specifically, the disclosure includes the method of making the zeolite in absence of any structural directing agents and zeolite seeds.

Description of the Related Prior Art

The description of the related prior art provided herein is for the purpose of generally presenting the context of the disclosure. Work of the presently named inventors, to the extent described in this background section, as well as aspects of the description which may not otherwise qualify as prior art at the time of filing, are neither expressly or impliedly admitted as prior art against the present disclosure.

Technological advancements have impacted the environment in many ways, to name a few, air and water pollution, depletion of natural resources and waste management constitute some of the major challenges.

On one hand, while advancements and innovations are important for human development and growth, equally important is prevention of the pollution as well as protection and management of the environment. Environmental protection laws and legislations have been established world over to prevent environmental deterioration and promote technologies that produce minimum impact on the environment. The laws also promote reducing use of environmentally toxic chemicals and curtailing production of waste. The chemical industry in particular and other industries in general producing chemical waste bear high responsibility towards protection of the environment from harmful toxic chemicals. Employing environment-friendly chemical products/processes that reduce or eliminate the use of substances that are harmful to health or the environment ('green chemistry') is expected to positively impact the environment and ultimately guide and provide necessary impetus towards the production of environmentally benign materials or processes in the future.

Zeolites are microporous, metalosilicate, especially aluminosilicate, minerals that occur naturally but are also produced industrially on a large scale. Because of the microporous nature and unique structural configurations, the zeolites widely find applications in various areas, such as, ion-exchange, catalysis, storage, building materials among others. Traditionally, the zeolites are prepared using structural directing agents such as tetra propyl ammonium hydroxide, tetra propyl ammonium bromide, isopropyl amine among others, or by preparing zeolite seeds before synthesizing the zeolite. However, due to the environmental impact accompanying the use of organic structural directing agents (OSDA), there is a need to prepare the zeolites via environment-friendly processes with minimum impact by employing and utilizing environmentally benign reagents. Consequently, some of the relevant activities towards methods of the zeolite production and synthesis include those below.

U.S. Ser. No. 11/267,717B2 discloses a method of synthesizing a zeolite having chabazite crystalline framework, that involves forming a reaction mixture comprising at least one alumina source comprising a zeolite, and a silica source. However, the method includes use of at least one organic structure directing agent to synthesize the zeolite.

KR2346811B1 discloses synthesizing a SSZ-39 zeolite involves forming an aqueous reaction mixture which includes at least one oxide of silicon, faujasite. The method includes use of at least one organic structure directing agent, alkali metal hydroxide and water, and at least one pore filling agent to make the process economical.

EP3016741B1 discloses a method of forming zeolite/zeolite-like/zeotype particles that involves adding a metal precursor to a silica/alumina source; followed by reducing; passing gaseous hydrocarbon/alkyl alcohol/alkyl ether; adding a structure directing agent, and crystallizing. The method also uses structure directing agents to prepare the particles.

Despite these recent advances, the drawbacks of each of the aforementioned methods indicate that there is still a need for ways of synthesizing the zeolites via greener routes, and more importantly, the challenge is that such methods and processes should be cost-effective, and rapid so as to attract industries to adopt these processes.

Accordingly, one object of the present disclosure to provide greener methods of zeolite preparation. Another object of the present disclosure is to provide a cost-effective and rapid process for the preparation of such compounds and related derivatives.

SUMMARY

Aspects of the present disclosure relate to a method of making a zeolite. The method includes a step of mixing an aluminum nitrate with an aqueous solution of NaOH to form a first mixture. The step is followed by mixing a silica gel with the first mixture to form a second mixture and heating the second mixture with microwave irradiation to form a first sample. The method further includes washing, drying, and ion exchanging the first sample with ammonium nitrate to form a second sample; and calcining the second sample to form the zeolite. The method includes making the zeolite in absence of zeolite seeds or a structural directing agent.

In one embodiment, the zeolite prepared by the method is in the form of cube-shape particles. In another embodiment, the cube-shape particles have a length, width, and height of 0.5 μm to 5 μm.

In an exemplary embodiment, the method of the present disclosure includes heating the second mixture at 40 to 200° C. In another exemplary embodiment, the method of the present disclosure includes heating the second mixture for 5 to 20 hours.

In a specific embodiment, the method includes the second mixture first heated at 50 to 60° C. for 30 to 90 minutes and then second heated at 150 to 200° C. for 6 to 12 hours.

In another exemplary embodiment, the method of the present disclosure includes calcining the second sample to form the zeolite. In one example, the second sample is calcined at 500 to 800° C. In another example, the second sample is calcined at 550 to 700° C.

The present disclosure also relate to the method of making the zeolite, where the zeolite is a ZSM-5 zeolite. In a specific embodiment, the zeolite has a substantially similar XRD (X-ray diffraction) pattern and acidity as a ZSM-5 zeolite prepared by hydrothermal heating.

The method of making the zeolite includes heating the second mixture with the microwave irradiation to form the first sample. In an embodiment, the microwave irradiation has a frequency of 300 MHz to 300 GHz. In another embodiment, the microwave irradiation has a wavelength of 0.01 to 1 m. In one embodiment, the microwave irradiation has a power of 5 to 300 W per gram of the second mixture.

In an embodiment, the method of present disclosure includes the making of the zeolite with a molar ratio of $Al_2O_3:xSiO_2:yH_2O:zNaOH$ and where x is in the range of 30 to 100; y is in the range of 10000 to 35000; and z is in the range of 8 to 30. In an exemplary embodiment, the $SiO_2/Al_2O_3$ has a molar ratio of 25 to 35. In another embodiment, the $SiO_2/Al_2O_3$ has a molar ratio of 45 to 55. In yet another example, the $SiO_2/Al_2O_3$ has a molar ratio of 65 to 75.

In an exemplary embodiment, the present disclosure relates to the method of zeolite making where the second mixture does not contain tetra propyl ammonium hydroxide, tetra propyl ammonium bromide, or isopropyl amine. In another exemplary embodiment, the present disclosure relates to the method of zeolite making where the zeolite has a substantially similar XRD pattern to a zeolite precursor formed after the drying and before the ion exchanging.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
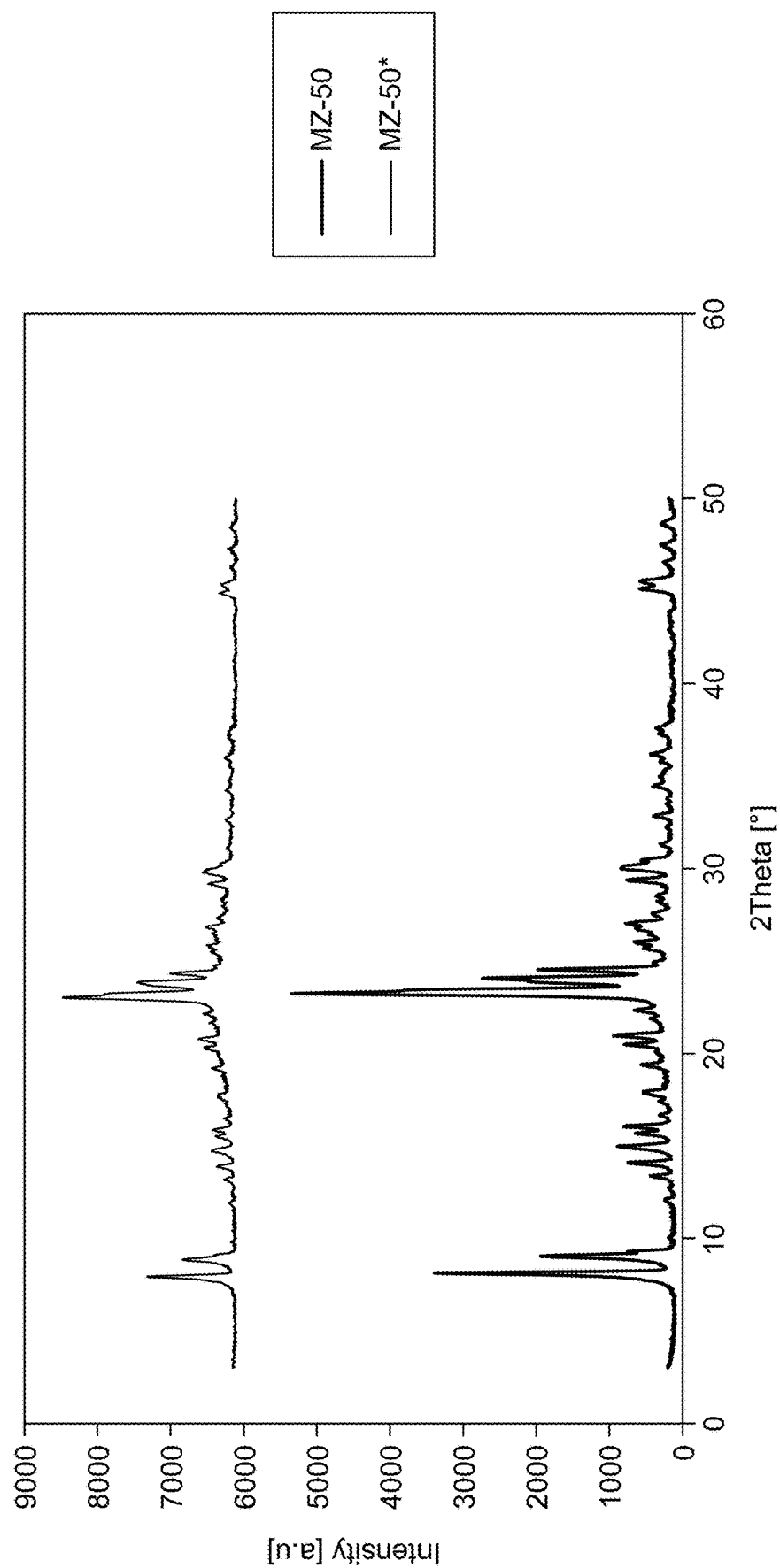
FIG. 1 shows an X-ray Diffraction (XRD) spectrum of ZSM-5 ($SiO_2/Al_2O_3$=50) synthesized using MICROSYNTH™ (MZ-50) and MAR6™ (MZ-50*) microwaves.

When describing the present disclosure, the terms used are to be construed in accordance with the following definitions, unless a context dictates otherwise.

Embodiments of the present disclosure will now be described more fully hereinafter with reference to the accompanying drawings, in which some, but not all embodiments of the disclosure are shown.

In the drawings, like reference numerals designate identical or corresponding parts throughout the several views. Further, as used herein, the use of singular includes plural and the words 'a', 'an' includes 'one' and means 'at least one' unless otherwise stated in this application.

Furthermore, the terms "approximately", "approximate", "about," and similar terms generally refer to ranges that include the identified value within a margin of 20%, 10%, or preferably 5%, and any values therebetween.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Although the open-ended term "comprising," as a synonym of terms such as including, containing, or having, is use herein to describe and claim the present composition and methods, the composition and/or methods may alternatively be described using more limiting terms, such as "consisting of" or "consisting essentially of" the recited components/ steps.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of silicon include $^{28}Si$, $^{29}Si$, and $^{30}Si$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

The terms "compound" and "derivative" as used herein, are used interchangeably, and refers to a chemical entity, whether in the solid, liquid or gaseous phase, and whether in a crude mixture or purified and isolated.

The terms 'elements' and 'components' include a single unit as well as more than a single unit unless specified otherwise.

The term "compounds" as used herein, refers to include the compounds disclosed in the present disclosure, and salts, solvates, and salts of solvates, and mixtures, known and unknown variations and forms thereof.

The terms "$Al_2O_3$" or "aluminum oxide" as used herein, include all the forms and oxides of aluminum oxide and also refers to aluminum oxide nano powder.

The terms "$SiO_2$" or "silicon dioxide" or "silica" as used herein, include all the forms and oxides of silica and also refers to silica nanoparticles.

The term "solvent" as used herein, is understood in a broad sense, in particular covering the functions of co-solvent, crystallization inhibitor, and stripping agent. The term solvent may especially denote a product that is liquid at the usage temperature, preferably having a melting point less than or equal to 20° C., preferably 5° C., preferably 0° C., which may contribute to rendering a solid substance liquid, or to preventing or reducing the rate of the solidification or the crystallization of material in a liquid medium. Non-limiting examples of solvent includes water, alcoholic solvents, preferably lower alcoholic solvents, more preferably ethanol.

The term "drying" as used herein, refers to a method of removing solvent and/or water or any type of moisture from compound of the disclosure and/or nanocomposite film which, unless otherwise specified, may be done at atmospheric pressure or under reduced pressure and with or without heating until the level of solvent and/or water contained reached an acceptable level.

A particle is defined as a small object that behaves as a whole unit with respect to its transport and properties. An average diameter (e.g., average particle size) of the particle, as used herein, and unless otherwise specifically noted, refers to the average linear distance measured from one point on the particle through the center of the particle to a point directly across from it. For polygonal shapes, the term "diameter", as used herein, and unless otherwise specified, refers to the greatest possible distance measured from a vertex of a polygon through the center of the face to the vertex on the opposite side.

The present disclosure relates to a method of making a zeolite by mixing an aluminum salt, preferably at least one selected from the group consisting of aluminum acetate, aluminum bromide, aluminum carbonate, aluminum chloride, aluminum nitrate, aluminum oxalate, aluminum oxide, preferably aluminum nitrate with an aqueous solution of NaOH to form a first mixture. The method includes mixing silica gel with the first mixture to form a second mixture and heating the second mixture with microwave irradiation to form a first sample. The method further includes washing, drying, and ion exchanging the first sample with ammonium salt, preferably at least one selected from the group consisting of ammonium acetate, ammonium bromide, ammonium carbonate, ammonium chloride, ammonium nitrate, ammonium oxalate, ammonium oxide, ammonium nitrate, preferably ammonium nitrate to form a second sample. The second sample is calcined to form the zeolite, and the method does not use a seed or a structural directing agent.

In some embodiments, the silica gel can be, based on density, a regular, intermediate, or a low density gel or a Type A, Type B, Type C silica or a combination thereof.

In an embodiment, the silica gel is added to the first mixture and stirred for up to 1 to 120 minutes, preferably 1 to 90 minutes, preferably 5 to 60 minutes, preferably 10 to 40 minutes, preferably 15 to 30 minutes, preferably 20 minutes.

In an embodiment, the second mixture is heated at 30 to 300° C., preferably 40 to 290° C., preferably 40 to 280° C., preferably 40 to 270° C., preferably 40 to 260° C., preferably 40 to 250° C., preferably 40 to 240° C., preferably 40 to 230° C., preferably 40 to 220° C., preferably 40 to 210° C., preferably 40 to 200° C.

In an embodiment, the second mixture is heated for 1 to 40 hours, preferably 2 to 30 hours, preferably 4 to 25 hours, preferably 5 to 20 hours. In an embodiment, the second mixture is first heated at 30 to 90° C., preferably 40 to 80° C., preferably 50 to 60° C. for 10 to 120 minutes, preferably 20 to 110 minutes, preferably 30 to 100 minutes, preferably 30 to 90 minutes and then second heated at 100 to 300° C., preferably 120 to 250° C., preferably 140 to 220° C., preferably 150 to 200° C. for 1 to 20 hours, preferably 2 to 18 hours, preferably 3 to 16 hours, preferably 6 to 12 hours.

In some specific embodiments, the second mixture is first heated at 60° C. for 1 hour and then second heated at 180° C. for 9 hours.

In an embodiment, the second sample is calcined at 300 to 1200° C., preferably 400 to 1100° C., preferably 500 to 900° C., preferably 500 to 800° C.

In some embodiments, the calcining step may occur before the ion-exchanging step to eliminate any impurities.

In an embodiment, the zeolite is ZSM-5 zeolite.

In an embodiment, the zeolite has a substantially similar XRD pattern and acidity as a ZSM-5 zeolite prepared by hydrothermal heating.

In an embodiment, the microwave irradiation has a frequency of 200 MHz to 600 GHz, preferably 250 MHz to 500 GHz, preferably 300 MHz to 400 GHz, preferably 300 MHz to 300 GHz.

In an embodiment, the microwave irradiation has a wavelength of 0.05 to 5 m, preferably 0.04 to 4 m, preferably 0.03 to 3 m, preferably 0.02 to 2 m, preferably 0.01 to 1 m.

In an embodiment, the microwave irradiation has a power of 1 to 600 W, preferably 2 to 580 W, preferably 3 to 560 W, preferably 4 to 500 W, preferably 5 to 450 W, preferably 5 to 400 W, preferably 5 to 350 W, preferably 5 to 300 W per gram of the second mixture.

In an embodiment, the method includes washing the first sample with water and drying the first sample at a temperature between 100, 105, 110, or 115 to 120° C. for 10 to 15 hours before ion exchanging the first sample with ammonium nitrate to form the second sample.

The drying may be accomplished with a rotary vacuum, a spray tower, a freeze dryer, a flow of heated air, a flow of dry air or gas, a dryer, a cylindrical dryer, a zeolite dryer, an oven, a desiccator, a heat lamp, or a vacuum desiccator. In other embodiments, some solvents may evaporate quickly enough on their own at ambient conditions in an uncovered or vented container, with no active drying step required.

In an example, the first sample is dried at 110° C. for 12 hours before ion exchanging with ammonium nitrate to form the second sample. The water used to wash the first sample may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water and at 22-27° C. has a conductivity of less than 10 $\mu S \cdot cm^{-1}$, preferably less than 1 $\mu S \cdot cm^{-1}$, a resistivity greater than 0.1 $M\Omega \cdot cm$, preferably greater than 1 $M\Omega \cdot cm$, more preferably greater than 10 $M\Omega \cdot cm$, a total solid concentration less than 5 mg/kg, preferably less than 1 mg/kg, and a total organic carbon concentration less than 1000 μg/L, preferably less than 200 µg/L, more preferably less than 50 µg/L. In an embodiment, water is deionized water.

In some embodiments, the ion-exchange can be carried out by suspending the first sample in a solution including the ammonium nitrate.

In an embodiment, the ion-exchange can be carried out multiple times before the calcining step.

In one embodiment, the zeolite particles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In one embodiment, the zeolite particles are monodisperse having a particle diameter distribution ranging from 80% of the average particle diameter to 120% of the average particle diameter, preferably 85-115%, preferably 90-110% of the average particle diameter. In another embodiment, the zeolite particles are not monodisperse.

In one embodiment, zeolite clusters may be considered agglomerates of zeolites. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the zeolite particles having a mean diameter as previously described.

Some embodiments of the ZSM-5 zeolite are prepared via continuous flow hydrothermal synthesis in absence of any seed or structural directing agents.

In some embodiments, the first mixture may also include about 20 to 99 wt. %, preferably 20 to 95 wt. %, preferably 30 to 90 wt. %, preferably 40 to 85 wt. %, and more preferably 50 to 75 wt. % of water. The first mixture further includes an aluminum source to facilitate in-situ crystallization of ZSM-5 zeolite, such that the ZSM-5 zeolite containing microspheres may achieve a $SiO_2/Al_2O_3$ molar ratio of 20 to 100, preferably 25 to 75.

In some embodiments, the ZSM-5 zeolite includes large ZSM-5 crystals which are free of any structural defects, and show absence of any external non selective surface acid sites and extra-framework aluminum (EFAl) species.

In an embodiment, the zeolites display high stability.

In an embodiment, the zeolites show high selectivity towards light olefins.

In an embodiment, the zeolite is in the form of cube-shape particles.

The zeolite may have a spherical shape, or may be shaped like cylinders, boxes, spikes, flakes, plates, ellipsoids, toroids, stars, ribbons, discs, rods, granules, prisms, cones, flakes, platelets, sheets, or some other shape.

In an embodiment, the cube-shape particles have a length, width, and height of 0.1 µm to 50 µm, preferably 0.2 µm to 40 µm, preferably 0.3 µm to 30 µm, preferably 0.4 µm to 20 µm, preferably 0.5 µm to 10 µm, preferably 0.5 µm to 5 µm.

In an embodiment, the zeolite cube-shape particles can be molded into different shapes such as spherical or any irregular shape by mechanical treatments.

In some examples, the mechanical treatment includes application of ball milling and grinding.

In an embodiment, the zeolite has a molar ratio of $Al_2O_3$:$xSiO_2$:$yH_2O$:$zNaOH$. The x may be in the range of 20 to 120, preferably 25 to 110, preferably 30 to 100, y may be in the range of 8000 to 45000, preferably 9000 to 42000, preferably 9500 to 40000, preferably 9800 to 38000, preferably 10000 to 35000, and z may be in the range of 4 to 50, preferably 5 to 48, preferably 6 to 45, preferably 7 to 40, preferably 8 to 35, preferably 8 to 30.

In an embodiment, the $SiO_2/Al_2O_3$ has a molar ratio of 10 to 40, preferably 15 to 38, preferably 17 to 37, preferably 20 to 36, preferably 22 to 35, preferably 25 to 35.

In an embodiment, the $SiO_2/Al_2O_3$ has a molar ratio of 35 to 60, preferably 38 to 59, preferably 40 to 58, preferably 42 to 57, preferably 45 to 55.

In an embodiment, the $SiO_2/Al_2O_3$ has a molar ratio of 61 to 90, preferably 62 to 87, preferably 63 to 85, preferably 64 to 83, preferably 65 to 80, preferably 65 to 79, preferably 65 to 78, preferably 65 to 77, preferably 65 to 75.

In an embodiment, the method excludes use of any organic templates for the synthesis of the zeolite.

In an embodiment, the second mixture does not contain tetra propyl ammonium hydroxide, tetra propyl ammonium bromide, or isopropyl amine or any known or unknown structural directing agent.

In an embodiment, the zeolite has a substantially similar XRD pattern to a zeolite precursor formed after the drying and before the ion exchanging step.

The method of making the zeolite according to the present disclosure include use of microwave energy to prepare the zeolite. Whereupon the microwave application reduces the manufacturing cost and results in rapid production of the zeolite.

The method includes conducting the synthesis of the zeolite on different microwave equipment in absence of any organic templates and in absence of the zeolite seeds in a short interval of time.

Examples

Materials

For zeolite synthesis according to the method of the present disclosure, following reactants were procured including silica gel (Sigma Aldrich), NaOH (MercK), deionized water and aluminum nitrate nonahydrate (Sigma Aldrich).

Sample Synthesis

In the synthesis of zeolite samples, the reaction elements were added according to the following stoichiometric ratio: 1 $Al_2O_3$:$xSiO_2$:$yH_2O$:$zNaOH$ (where x=35 to 80; y=15000 to 24000; z=13 to 20). For instance, in the synthesis of ZSM-5 zeolite with $SiO_2/Al_2O_3$=50 (1 $Al_2O_3$:50$SiO_2$: 22867$H_2O$:14NaOH), 1.05 g of the NaOH was dissolved in 42. 216 g of water. Thereafter, 1.405 g aluminum nitrate nonahydrate was added and allowed to dissolve. Thereafter, 5.62 g of silica gel was added and stirred for 10 minutes. The sample was placed in a MICROSYNTH™ or MARS6™ microwaves system and ramped to 60° C. (in 1 minute for the MICROSYNTH™ and 15 minutes for the MARS6™) held for 1 hour at 60° C. for aging and finally ramped to crystallization temperature of 180° C. in 5 minutes for the MICROSYNTH™ and 15 minutes for the MARS6™ and then held 9 hours. Thereafter, the sample was washed several times with deionized water and then dried at 110° C. for 12 hours. During the synthesis procedure, the samples were agitated at 50% stirrer speed in the MICROSYNTH™ microwave and medium speed in the MARS6™ microwave.

Samples with $SiO_2/Al_2O_3$ of 35 and 70 were also synthesized using the MICROSYNTH™ microwave using the stoichiometric ratio 1 $Al_2O_3$:35$SiO_2$:16159$H_2O$:13NaOH;

and 1 $Al_2O_3$:70$SiO_2$:31868$H_2O$:20NaOH respectively. Here, aging and synthesis time were 2 hours and 12 hours, respectively for both the cases. The prepared samples were then ion exchanged with 1M ammonium nitrate twice and then calcined at 600° C. to realize the H-forms of each zeolite sample.

In a preferred embodiment of the invention a mixture formed by reacting aluminum nitrate, NaOH and silica gel remains in a microwave reactor during other steps of the process so that drying and ion exchange are also be carried out under microwave radiation conditions. In a preferable embodiment a microwave reactor having reaction compartment containing a reaction chamber and a buffered chamber are used. The reaction chamber subjects the reaction mixtures to microwave radiation whereas materials in the buffer chamber are protected from exposure to microwave radiation. Reacting, aging, crystallizing and drying are all carried out under microwave radiation. Subsequent decantation of the reaction mixture and followed by washing with water is carried out in a "one pot" fashion in the same reaction vessel with decanted fluids directed to the buffer chamber, wash fluids and ion exchange fluids originating and/or holding in the buffer chamber. Preferably the crystallized product is washed with water while undergoing microwave radiation exposure (e.g., heating to up to 50° C.). Subsequently one or more ion exchange solutions may be flowed into the reaction chamber and the resulting mixture is subject to microwave radiation (e.g., heating to up to 50° C., 80° C. or 95° C.). Drying is also carried out in the same reaction chamber under conditions of microwave radiation heating.

Referring now to FIG. 1, X-ray diffraction (XRD) patterns of a ZSM-5 zeolite with $SiO_2$/$Al_2O_3$ of 50 prepared using both the MICROSYNTH™ microwave (MZ-50) and the MARS6™ (MZ-50*) microwave respectively are shown. Both samples show a typical XRD pattern for the pure ZSM-5 zeolite. However, the MZ-50 displayed better crystallization than the MZ-50*, as such the MICROSYNTH™ microwave was employed in the synthesis of other $SiO_2$/$Al_2O_3$.

Figure 2:
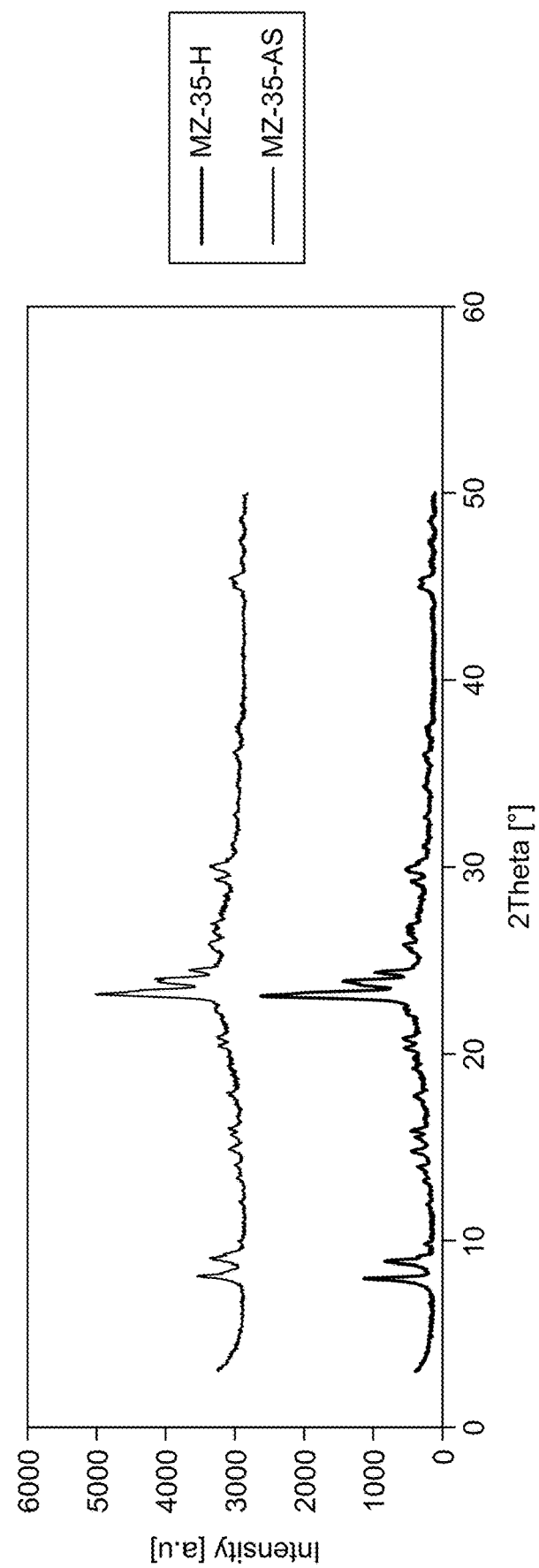
FIG. 2 shows an XRD spectrum of ZSM-5 ($SiO_2/Al_2O_3$=35) in an as-synthesized form (MZ-35-AS) and in H-form (MZ-35-H)
Figure 3:
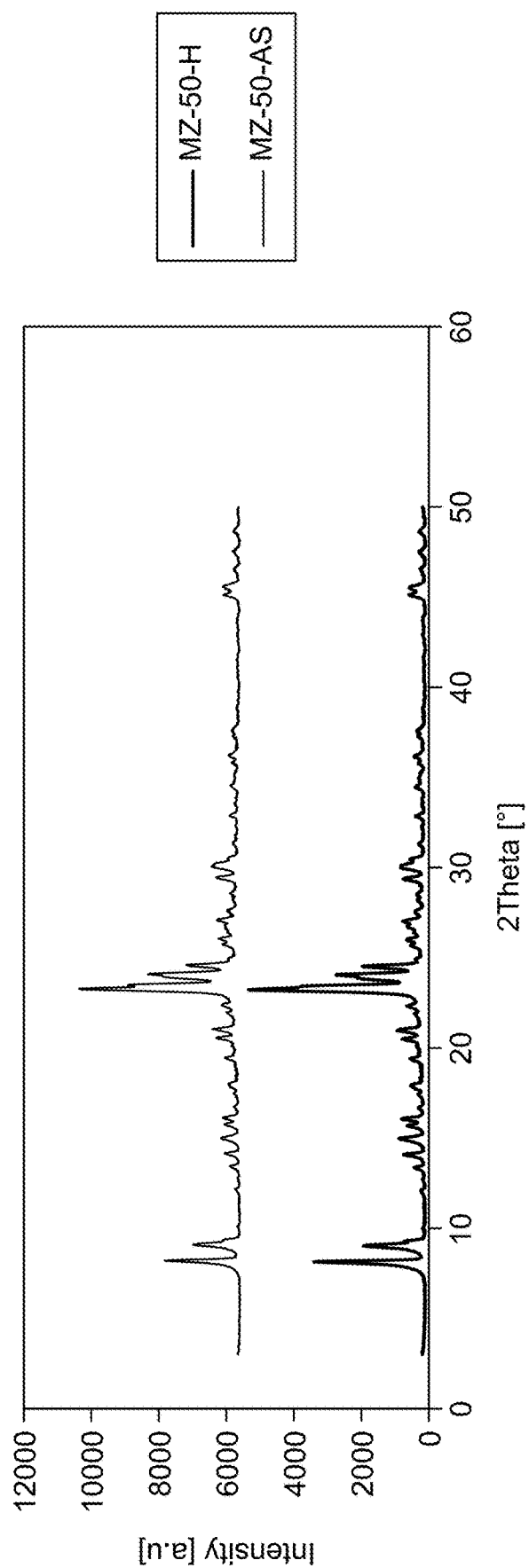
FIG. 3 shows an XRD spectrum of ZSM-5 ($SiO_2/Al_2O_3$=50) in an as-synthesized form (MZ-50-AS) and in H-form (MZ-50-H)
Figure 4:
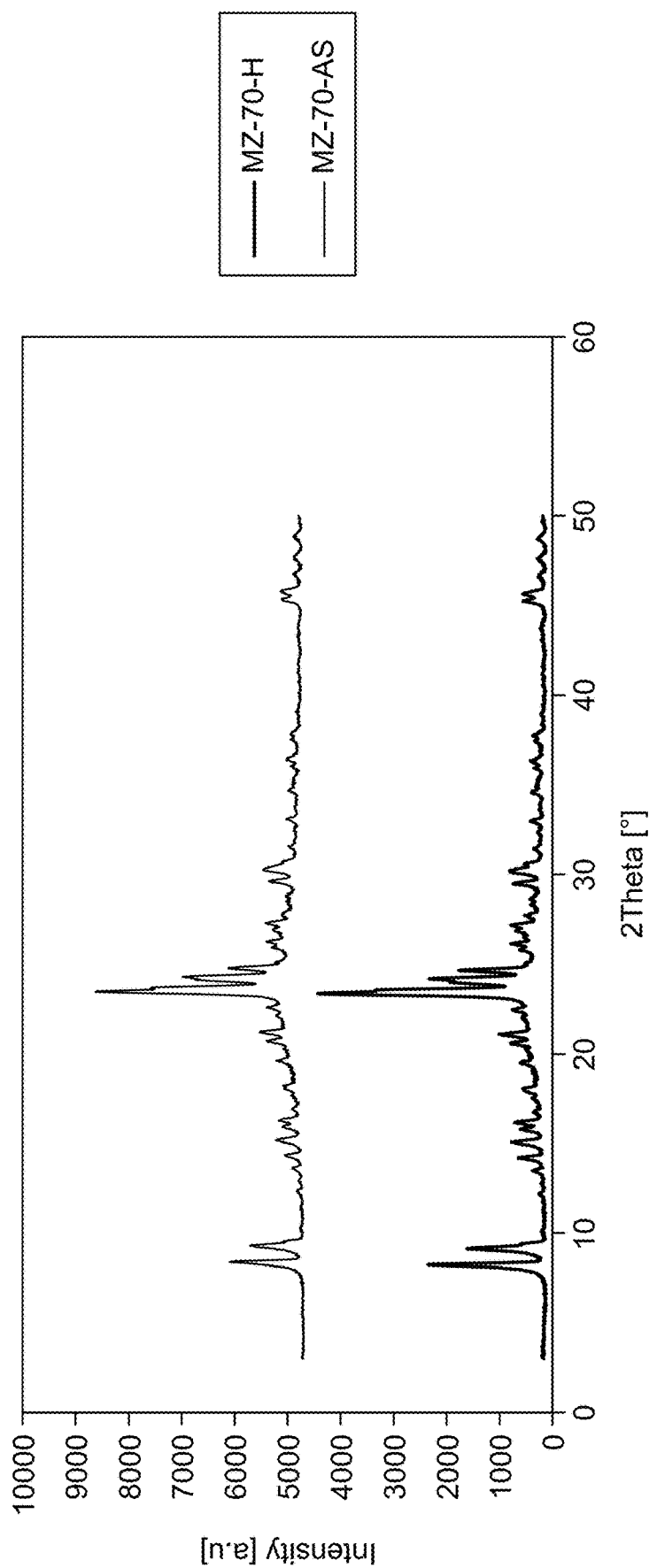
FIG. 4 shows an XRD spectra of ZSM-5 ($SiO_2/Al_2O_3$=70) in an as-synthesized form (MZ-70-AS) and in H-form (MZ-70-H)

Furthermore, FIG. 2, FIG. 3 and FIG. 4 show the XRD patterns of ZSM-5 zeolite with $SiO_2$/$Al_2O_3$ of 35, 50 and 70 in as-prepared (MZ-35-AS or MZ-50-AS or MZ-75-AS) form and after ion exchange in respective H-form (MZ-35-H or MZ-50-H or MZ-75-H). All samples displayed typical ZSM-5 crystal pattern before and after exchange to their hydrogen form with well-preserved crystal structure as shown in the XRD patterns.

Figure 5:
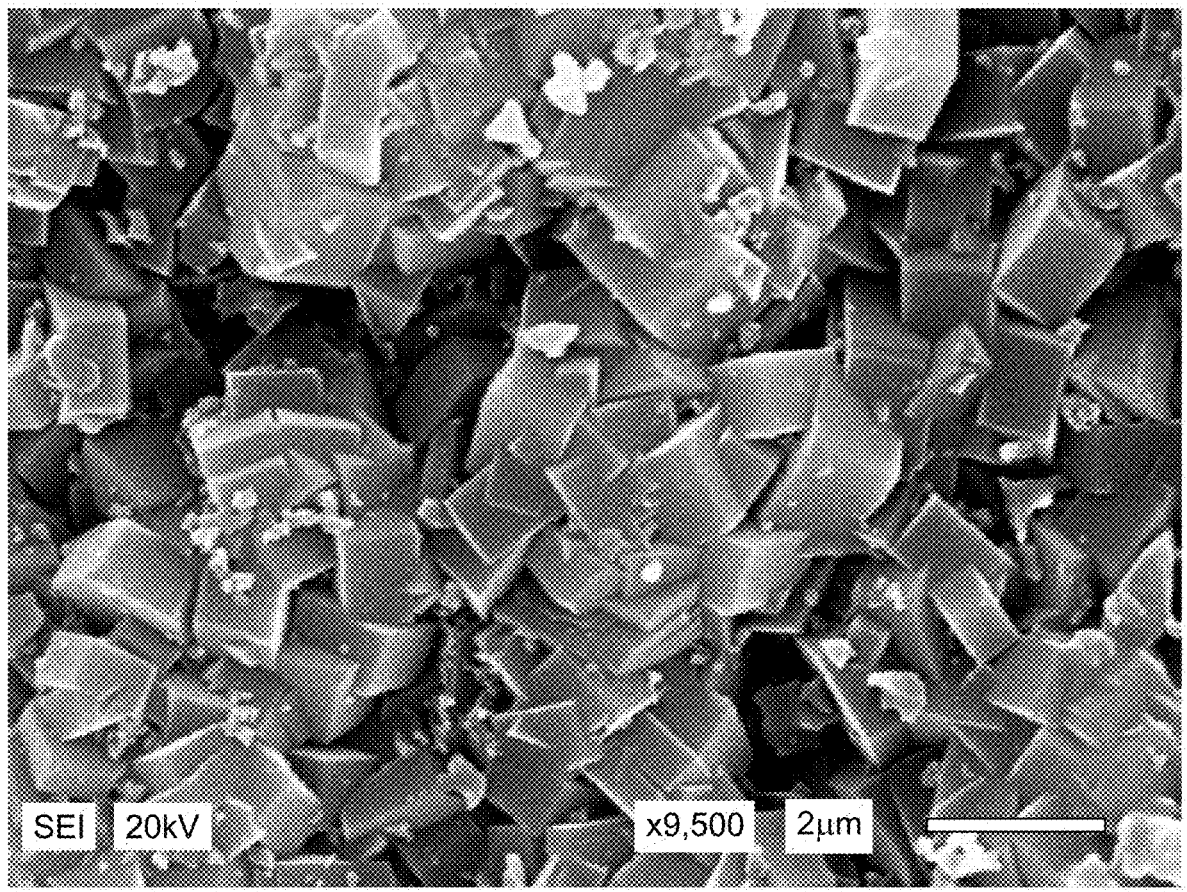
FIG. 5 shows a scanning electron microscope (SEM) image of MZ-50 confirming cube-shaped zeolite particles.
Figure 6:
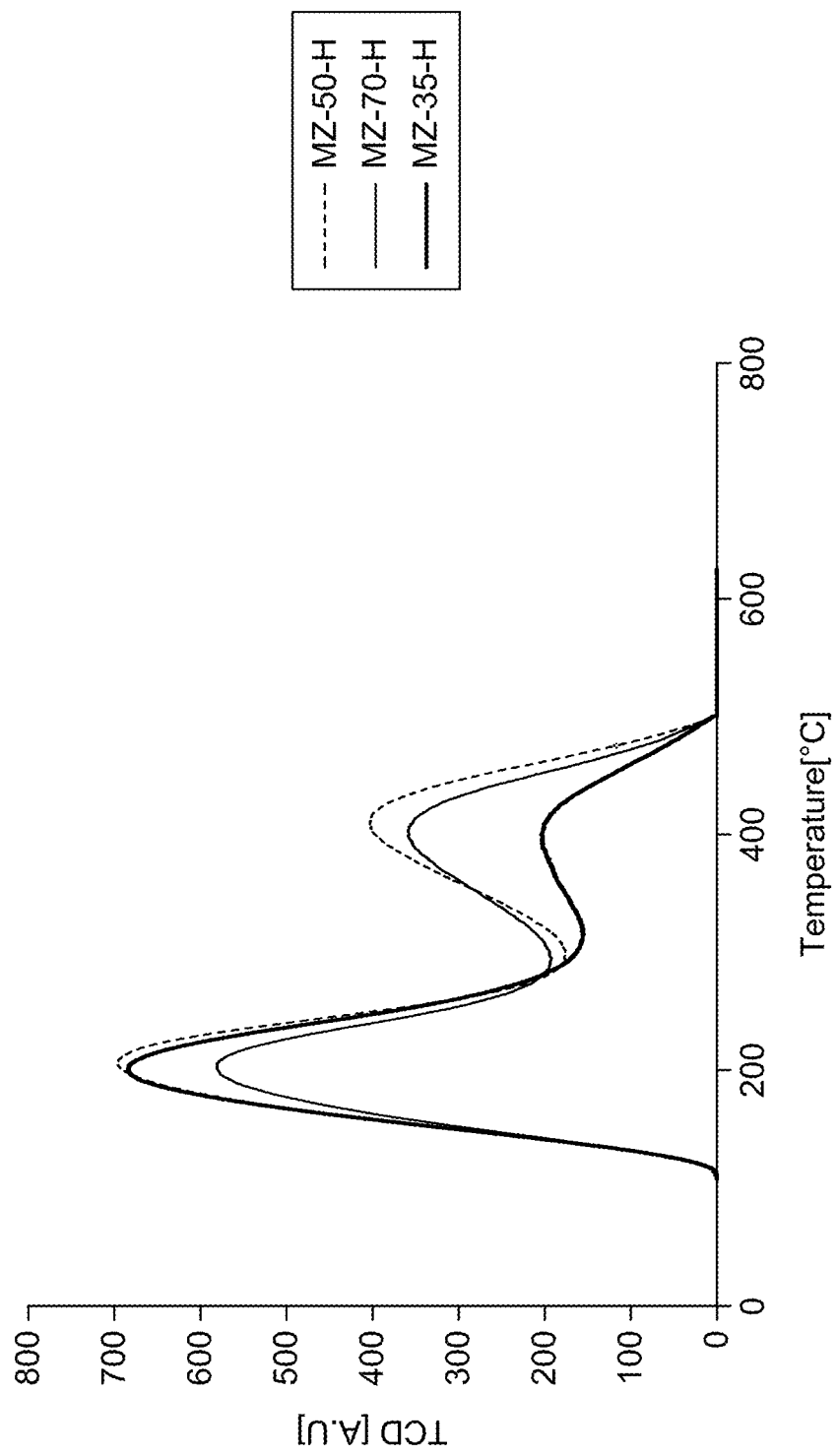
FIG. 6 shows a temperature-programmed desorption of ammonia (NH3-TPD) plot of H-forms of the ZSM-5 zeolite with $SiO_2/Al_2O_3$ of 35 (MZ-35-H), 50 (MZ-50-H) and 70 (MZ-70-H).

Referring to FIG. 5, a scanning electron microscope (SEM) image of the MZ-50, noticeably shows the samples are cube-shaped. The resulting shape is typical of the ZSM-5 zeolite and is a function of the source of silica and alumina used during synthesis. On the other hand, FIG. 6 presents a temperature-programmed desorption of ammonia (NH3-TPD) plot of the prepared ZSM-5 zeolites. All samples displayed acidity with respect to their respective $SiO_2$/$Al_2O_3$. All samples had clear distinct peaks typical of the ZSM-5 zeolites, the first representing the weak and medium acid sites and the later the strong acid sites. Acidity of samples were in the order MZ-50>MZ-70>MZ-25. Although the MZ-35 has more Al atoms, the strong acid sites are weaker than other samples due to the MZ-35 having more acid site density and more extra framework Al.

Thus, the method of making zeolites according to present disclosure is a green and environmentally friendly fast method for synthesizing the ZSM-5 zeolites with different $SiO_2$/$Al_2O_3$ ratios using microwave-assisted heating in the absence of organic templates and ZSM-5 seeds. Furthermore, the method enables the synthesis of the zeolites in a short time interval and can be conducted on different microwave synthesis machines as demonstrated in the above findings.

In all the above described preparations, the reaction products may be isolated from the reaction medium and, if necessary, further purified according to methodologies generally known in the art such as, for example, extraction, crystallization, trituration and chromatography.

The compounds of the disclosure as prepared in the processes described above may be synthesized in the form of mixtures of various known or unknown forms, in particular zeolites including various impurities, that can be separated from one another following art-known resolution procedures.

In an embodiment, the present disclosure relates to the zeolite making comprising at least 0.001 wt %, at least 0.01 wt %, at least 0.1 wt %, at least 0.5 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, at least 99 wt %, or at least 99.9 wt % of the zeolite or any zeolite mixture thereof.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method of making a zeolite, the method comprising:
   mixing an aluminum nitrate with an aqueous solution of NaOH to form a first mixture;
   mixing silica gel with the first mixture to form a second mixture;
   heating the second mixture with microwave irradiation to form a first sample;
   washing, drying, and ion exchanging the first sample with ammonium nitrate to form a second sample; and
   calcining the second sample to form the zeolite,
   wherein the method does not use a seed or a structural directing agent,
   wherein the zeolite has a molar ratio of $Al_2O_3$:x$SiO_2$:y$H_2O$:zNaOH, and
   x is in the range of 30 to 100,
   y is in the range of 10000 to 35000, and
   z is in the range of 8 to 30.

2. The method of claim 1, wherein the mixing, heating, washing, drying and ion exchanging are carried out in the same reaction vessel.

3. The method of claim 2, further comprising:
   decanting a supernatant fluid from the first sample then drying the first sample in the same reaction vessel with microwave radiation at a temperature of at least 110° C., then
   contacting the dried first sample with an ion exchange fluid and heating with microwave radiation to a temperature of from 40 to 85° C.

4. The method of claim 1, wherein the second mixture is first heated at 50 to 60° C. for 30 to 90 minutes and then second heated at 150 to 200° C. for 6 to 12 hours.

5. The method of claim 1, wherein the second sample is calcined at 500 to 800° C.

6. The method of claim 1, wherein the second sample is calcined at 550 to 700° C.

7. The method of claim 1, wherein the zeolite is ZSM-5 zeolite.

8. The method of claim 1, wherein the zeolite has a substantially similar XRD pattern and acidity as a ZSM-5 zeolite prepared by hydrothermal heating.

9. The method of claim 1, wherein the microwave irradiation has a frequency of 300 MHz to 300 GHz.

10. The method of claim 1, wherein the microwave irradiation has a wavelength of 0.01 to 1 m.

11. The method of claim 1, wherein the microwave irradiation has a power of 5 to 300 W per gram of the second mixture.

12. The method of claim 1, wherein the zeolite is in the form of cube-shape particles.

13. The method of claim 12, wherein the cube-shape particles have a length, width, and height of 0.5 µm to 5 µm.

14. The method of claim 1, wherein the $SiO_2/Al_2O_3$ has a molar ratio of 25 to 35.

15. The method of claim 1, wherein the $SiO_2/Al_2O_3$ has a molar ratio of 45 to 55.

16. The method of claim 1, wherein the $SiO_2/Al_2O_3$ has a molar ratio of 65 to 75.

17. The method of claim 1, wherein the second mixture does not contain tetra propyl ammonium hydroxide, tetra propyl ammonium bromide, or isopropyl amine.

18. The method of claim 1, wherein the zeolite has a substantially similar XRD pattern to a zeolite precursor formed after the drying and before the ion exchanging.

* * * * *